(12) United States Patent
Higgins et al.

(10) Patent No.: US 9,581,325 B2
(45) Date of Patent: Feb. 28, 2017

(54) METHOD AND APPARATUS FOR IMPROVED FIRING OF BIOMASS AND OTHER SOLID FUELS FOR STEAM PRODUCTION AND GASIFICATION

(71) Applicants: Daniel R. Higgins, Tigard, OR (US); Eugene Sullivan, Mobile, AL (US)

(72) Inventors: Daniel R. Higgins, Tigard, OR (US); Eugene Sullivan, Mobile, AL (US)

(*) Notice: Subject to any disclaimer, the term of this patent is extended or adjusted under 35 U.S.C. 154(b) by 0 days.

(21) Appl. No.: 14/860,600

(22) Filed: Sep. 21, 2015

(65) Prior Publication Data

US 2016/0109116 A1  Apr. 21, 2016

Related U.S. Application Data

(63) Continuation of application No. 13/851,883, filed on Mar. 27, 2013, now Pat. No. 9,140,446.

(Continued)

(51) Int. Cl.
| | |
|---|---|
| *C10J 3/34* | (2006.01) |
| *F22B 21/00* | (2006.01) |
| *F23M 3/22* | (2006.01) |
| *F23C 9/00* | (2006.01) |
| *F23H 13/06* | (2006.01) |
| *F23K 3/00* | (2006.01) |
| *F22G 1/04* | (2006.01) |

(Continued)

(52) U.S. Cl.
CPC .............. *F22B 21/00* (2013.01); *F22B 21/14* (2013.01); *F22G 1/04* (2013.01); *F22G 5/02* (2013.01); *F23C 9/00* (2013.01); *F23C 9/006* (2013.01); *F23G 5/002* (2013.01); *F23G 5/04* (2013.01); *F23G 5/24* (2013.01); *F23G 5/46* (2013.01); *F23G 7/00* (2013.01); *F23G 7/10* (2013.01); *F23H 13/06* (2013.01); *F23J 1/00* (2013.01); *F23K 3/00* (2013.01); *F23L 7/007* (2013.01); *F23M 3/22* (2013.01); *F23C 2900/01001* (2013.01); *F23G 2202/106* (2013.01); *F23G 2205/16* (2013.01); *F23G 2206/10* (2013.01); *Y02E 20/12* (2013.01); *Y02E 20/344* (2013.01)

(58) Field of Classification Search
CPC . F26B 23/001; C10J 3/34; F23C 10/24; F23B 1/36
USPC ............... 122/4 D, 412, 413, 414, 417, 449; 110/245, 101 R, 104 R, 111, 293, 313; 432/16, 58, 95, 101, 102, 214, 215, 217
See application file for complete search history.

(56) References Cited

U.S. PATENT DOCUMENTS

| | | |
|---|---|---|
| 105,397 A | 7/1870 | Whitlock |
| 2,503,555 A | 4/1950 | Lykken |

(Continued)

FOREIGN PATENT DOCUMENTS

JP  2002162002  6/2002

*Primary Examiner* — Gregory A Wilson
(74) *Attorney, Agent, or Firm* — Scheinberg & Associates, P.C.; John B. Kelly; Michael O. Scheinberg

(57) ABSTRACT

A ground supported single drum power boiler is described combining a refractory lined and insulated V-Cell floor; refractory lined and insulated combustion chamber; integrated fuel chutes configured to pre-dry wet solid fuel; top mounted fuel bin; internal chamber walls; configurable combustion air systems; and a back pass with after-burner ports and cross flow superheaters. The boiler can be configured in pre-assembled modules to minimize the field construction time and cost. An alternative embodiment is adaptable as a gasifier.

18 Claims, 5 Drawing Sheets

Related U.S. Application Data

(60) Provisional application No. 61/616,211, filed on Mar. 27, 2012.

(51) Int. Cl.

| | | |
|---|---|---|
| *F23L 7/00* | (2006.01) | |
| *F23G 5/00* | (2006.01) | |
| *F23G 5/04* | (2006.01) | |
| *F23G 5/46* | (2006.01) | |
| *F23G 7/10* | (2006.01) | |
| *F23J 1/00* | (2006.01) | |
| *F22B 21/14* | (2006.01) | |
| *F22G 5/02* | (2006.01) | |
| *F23G 5/24* | (2006.01) | |
| *F23G 7/00* | (2006.01) | |

(56) References Cited

U.S. PATENT DOCUMENTS

| | | | |
|---|---|---|---|
| 2,512,259 A | 6/1950 | Pike | |
| 3,048,381 A | 8/1962 | Corson | |
| 3,581,683 A | 6/1971 | Collier, Jr. | |
| 4,054,409 A | 10/1977 | Ando et al. | |
| 4,183,330 A * | 1/1980 | Bryers | F22B 31/0038 110/245 |
| 4,268,244 A * | 5/1981 | Dawson | B01J 8/1818 122/4 D |
| 4,356,794 A | 11/1982 | Bouman et al. | |
| 4,418,649 A | 12/1983 | Purvis | |
| 4,823,740 A * | 4/1989 | Ohshita | B01J 8/1818 110/245 |
| 4,953,474 A | 9/1990 | Armitage | |
| 5,151,000 A | 9/1992 | Geraghty et al. | |
| 5,255,615 A | 10/1993 | Magaldi | |
| 5,401,130 A * | 3/1995 | Chiu | F23C 10/14 110/245 |
| 5,797,334 A * | 8/1998 | Weitzel | F23C 10/20 110/245 |
| 5,799,595 A | 9/1998 | Michelbrink et al. | |
| 6,003,475 A * | 12/1999 | Elsner | F22B 31/045 110/245 |
| 6,019,070 A | 2/2000 | Duffy | |
| 6,149,425 A | 11/2000 | Saddy et al. | |
| 6,230,633 B1 * | 5/2001 | Magaldi | B65G 53/44 110/165 R |
| 6,263,837 B1 * | 7/2001 | Utunen | B01J 8/44 110/245 |
| 8,276,528 B1 | 10/2012 | Higgins et al. | |
| 8,590,463 B1 | 11/2013 | Higgins et al. | |
| 2005/0109603 A1 | 5/2005 | Graham | |
| 2007/0187223 A1 | 8/2007 | Graham | |
| 2010/0132596 A1 | 6/2010 | Longatte | |
| 2011/0259253 A1 | 10/2011 | Higgins et al. | |
| 2013/0247800 A1 | 9/2013 | Higgins et al. | |

* cited by examiner

METHOD AND APPARATUS FOR IMPROVED FIRING OF BIOMASS AND OTHER SOLID FUELS FOR STEAM PRODUCTION AND GASIFICATION

This application is a Continuation of U.S. patent application Ser. No. 13/851,883, filed Mar. 27, 2013, which claims priority from U.S. Prov. Pat. No. 61/616,211, filed Mar. 27, 2012, both of which are hereby incorporated by reference.

BACKGROUND OF THE INVENTION

Power boilers have long been used by industries and utilities to produce steam for power production and process requirements. These boilers come in many types and sizes but embodiments of the present invention are an improvement on bed-fired water tube boilers ranging in steam production from 25 tons per hour to 300 tons per hour or more. The fuel may consist of bark, sawdust, wood chips, biomass trimmings, wood or other biomass pellets, urban waste, tire derived fuel (TDF), crushed coal, pet coke, sludge, fiber line rejects, straw based fuels, or other solid fuel, or a combination of fuels, and may have moisture content as high as 60%. These boilers are typically constructed of heavy wall steel tubes welded side by side into wall panels that form the front, rear and side walls of the boiler. The lower portion of this box forms the combustion chamber of the boiler and is sometimes called the furnace. The tubes are typically 2½" to 3" in outside diameter with a wall thickness from 0.18" to 0.25" and spaced apart 3" to 4" center to center. The gaps between the tubes are filled with steel strips about ¼" thick by the width of the gap. The entire panel is seal-welded air tight. The lower ends of the wall tubes are welded into larger diameter horizontal header pipes that feed water to the walls. The tops of the wall tubes are also connected to larger diameter horizontal collector pipes that carry the water away from the walls to the steam drum, located at the top of the boiler. The front wall tubes are typically bent over to form the roof of the boiler and those tubes can terminate in a collector pipe or directly to the steam drum. Similarly the rear wall tubes are typically bent to create a "bullnose" or "nose arch" to direct combustion gasses across the convective section of the boiler and then terminate in a water drum, steam drum, or collector pipe at the top of the boiler. The top of the bullnose is usually at the elevation of the water drum. The convective section generally consists of a set of superheaters, located at the top of the boiler, that are heated predominantly through convection. Downcomer pipes connect the steam drum or water drum at the top of the boiler to the header pipes at the bottom of the tube walls and feed water from the drum to the walls. The bottom of the boiler can be a travelling or vibrating grate, tilting grate, sloping grate, step grate, fluidized bed, or a stepped floor as described in U.S. patent application Ser. No. 12/557,085. Fuel enters the boiler through a chute or chutes penetrating one or more walls of the boiler and may be broadcast into the boiler by a fuel distributor, for example, as described in U.S. patent application Ser. No. 12/406,035. The fuel falls to the floor or grate where it is mixed with air and burns. The heat released by the burning fuel is absorbed by the wall tubes and heats the water in the walls, where the water expands thermally and starts to boil. The heated and boiling water is less dense than the water in the downcomer pipes, therefore a natural circulation is created with hotter water rising in the tube walls and cooler water descending in the downcomer pipes. The natural circulation is an inherent safety feature of these boilers as the circulation rate increases as more fuel is burned and more heat released in the combustion chamber.

As the water circulates from the steam drum, down through the downcomers, up through the walls, and back to the steam drum, some of the water may boil but most of the boiling occurs in the steam generating bank, sometimes called the boiler bank. In older two drum boilers, the generating bank is a set of tubes connecting the bottom of the steam drum to the top of a water drum, sometimes called a mud drum, located up to thirty feet or so directly below the steam drum. There are generally hundreds of tubes connecting the two drums. The generating bank is arranged so that hot gasses from the furnace flow across the tubes and heat the water circulating inside. About half of the tubes in the generating bank of a two drum boiler are up flow tubes and the remainders are down flow tubes. The gas cools as it passes through the generating bank, therefore the first tubes the gas contacts (the front tubes as the gas flow through a boiler is generally front to back) are hotter and more boiling occurs in those tubes. The boiling water is less dense therefore the water circulates from the steam drum down through the rear tubes to the water drum then up through the front tubes back to the steam drum. The steam drum is generally about half full of water with saturated steam being released at the surface. The steam goes through a set of moisture separators and then to the superheaters. In newer single drum boilers there is no water drum, instead, the generating bank is fed by external (non-heated) downcomers from the steam drum and the water circulates down the downcomers and back up through all of the generating bank tubes to the steam drum. Single drum boilers are less expensive to build because the drums, especially with hundreds of tube penetrations, are the most expensive components. They also have other advantages including more flexible arrangements for locating the steam drum.

Some boilers also have sets of tubes located just at the furnace exit and arranged to cross the boiler at the top of the combustion chamber. These are called screen tubes or screens, and are often arrayed as platens in which several tubes are in close parallel arrangement, one on top of another, extending from the front or rear wall of the boiler through the opposite wall. These platens are generally separated 12"-15" apart side to side and slope upward slightly to the other side of the boiler, or they may bend part way across the boiler and rise up vertically through the roof. The screen tubes are fed by external (non-heated) downcomers from the steam drum or water drum at their lower end and relieved back to the steam drum at their upper end. Water circulates from the steam drum or water drum through the screens and back up to the steam drum. The screens are located where the gasses are very hot and absorb heat predominantly by radiation.

After the steam leaves the steam drum it goes to the superheaters. These are sets of tubes typically located at the top of the boiler, above the screen tubes and in front of the generating bank. The superheaters increase the temperature of the steam from the saturation temperature in the steam drum to the final temperature desired for the process or power plant. The superheater tubes are typically arranged as vertical platens with up to a dozen tubes or more in close parallel arrangement front to back in each platen. There are many platens located across the width of the boiler with a spacing of 6"-15" between platens. There are frequently three or more superheater sections with external (unheated) connecting pipes and/or desuperheaters between the sections. Desuperheaters or attemporators control the final steam temperature by spraying water into the steam, or other means. The superheater tubes start at the top of the boiler and drop vertically to just above the bullnose then run up and down a number of times before exiting back through the roof. The steam passes through the superheaters just once therefore the superheaters are not part of the boiler circulation circuits.

After the combustion gasses exit the generating bank they typically flow through an economizer or an air heater. Economizers are tube bundles either in cross flow or parallel flow to the gas stream through which the feedwater passes once and is heated and then goes to the steam drum. The feedwater flow is controlled to maintain the water level in the steam drum. Feedwater makes up for the steam that is produced and exits the boiler. Upon entry into the drum, feedwater is baffled and mixes with some of the water already within the steam drum to flow to the downcomer pipes or downcomer tubes. This feedwater mixed zone is colder and has higher density, which provides the driving head for the natural circulation in the boiler. The economizer may be located immediately after the generating bank (relative to the gas flow) integral with the boiler, or it may be located downstream from a tubular air heater or a dust collector.

Some of these boilers are supported from underneath (ground supported) but most, especially larger boilers, are hung from the top and expand downward as they heat up. A "hung" boiler typically may require a very strong and expensive structure to support the boiler. One of the biggest problems with current boiler design is the cost of erection. Smaller boilers are often supplied as a single unit or "package" boiler but larger boilers typically may be erected in the field. This frequently takes much longer and may be much more expensive than anticipated, driving up the actual cost of the boiler. To partially address this problem, some boilers have been "modularized" to speed up the construction and reduce the risk associated with assembling the boiler in the field. Embodiments of present invention incorporate some specific modular features to minimize the time and cost to erect the boiler.

Boilers as described above have been in use for many years and the technology is very mature, but they are very expensive and have significant operational limitations. Grate fired boilers and fluidized bed boilers are limited in the temperatures they can tolerate in the lower furnace otherwise they will over heat the grate or sand bed. They also do a poor job of mixing the combustion air and pyrolysis gasses above the bed because the air flow arrangement is dictated by the requirements to cool the grate or fluidize the sand bend. This leaves little setup flexibility to improve combustion in the boiler. Mechanical grates suffer from poor reliability and fluidized bed boilers suffer from excessive sand erosion and sand agglomeration. These deficiencies are addressed with the introduction of stepped floor and fuel drying chute technologies as described in U.S. patent application Ser. Nos. 12/557,085 and 12/471,081 respectively, and provisional application 61/522,939. Aspects of those technologies are incorporated into embodiments of the present invention to improve the combustion of difficult to burn fuels.

SUMMARY OF THE INVENTION

It is an object of the invention to provide an improved boiler.

In some embodiments, fuel falls into one or more troughs at the bottom of the boiler, with each trough lined with an insulating material and refractory material, so that the structure acts to reduce temperature variations in the furnace. In some embodiments, a fuel supply located on top of the boiler along with a fuel feed system enables rapid and preferably independent control of the supply of fuel to different portions of the furnace. In some embodiments, the boiler is composed of modules that can be easily transported for assembly on site. In some embodiments, an array of chamber walls facilitates more efficient heat transfer from the combustion gases to improve steam generation.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Various embodiments of the present invention include several novel features that can significantly reduce the capital cost of the boiler while further improving the ability to burn difficult fuels.

Figure 1:
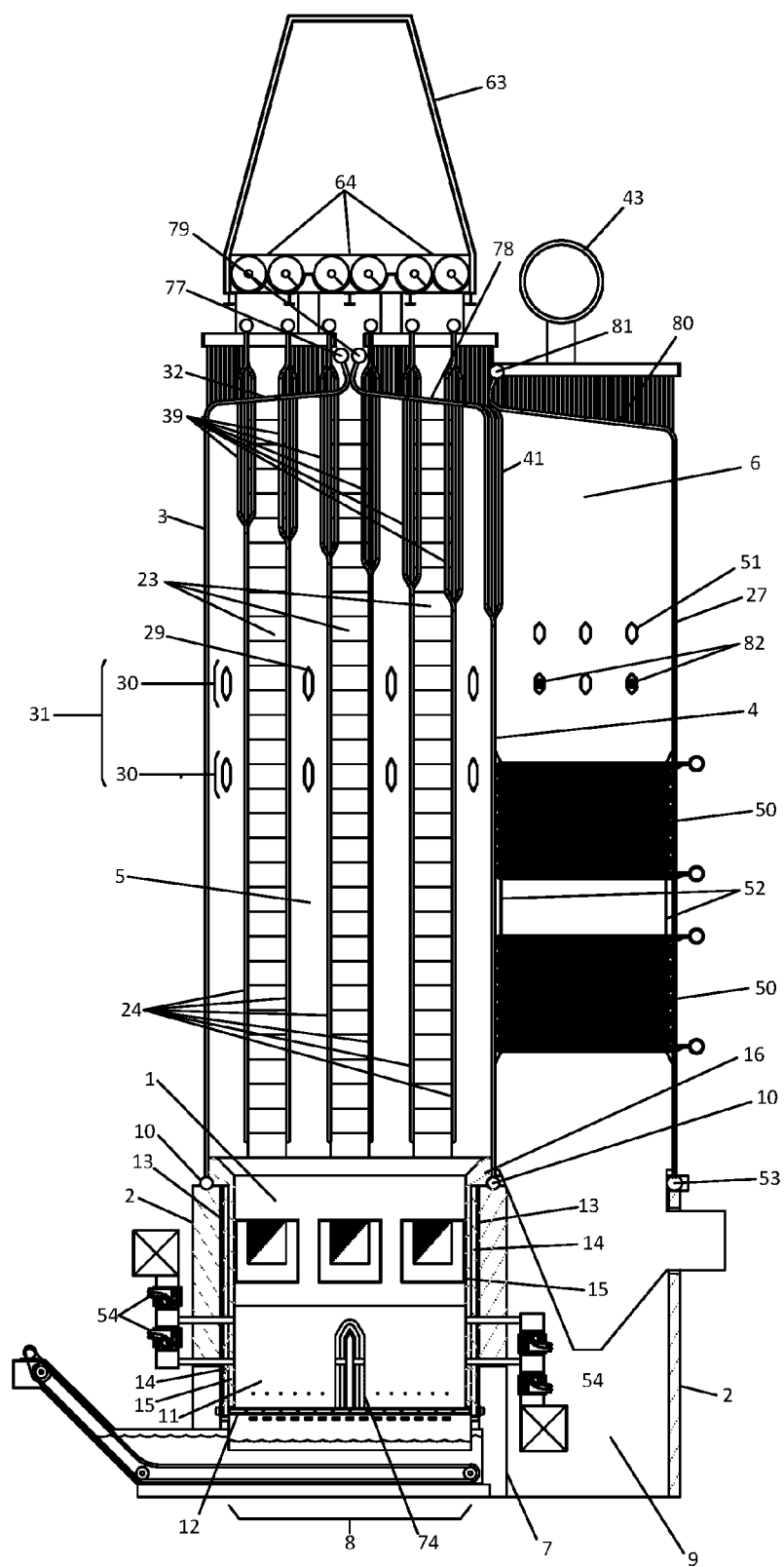
FIG. 1 is a sectional side view of a boiler in accordance with one or more embodiments of the present invention.
Figure 2:
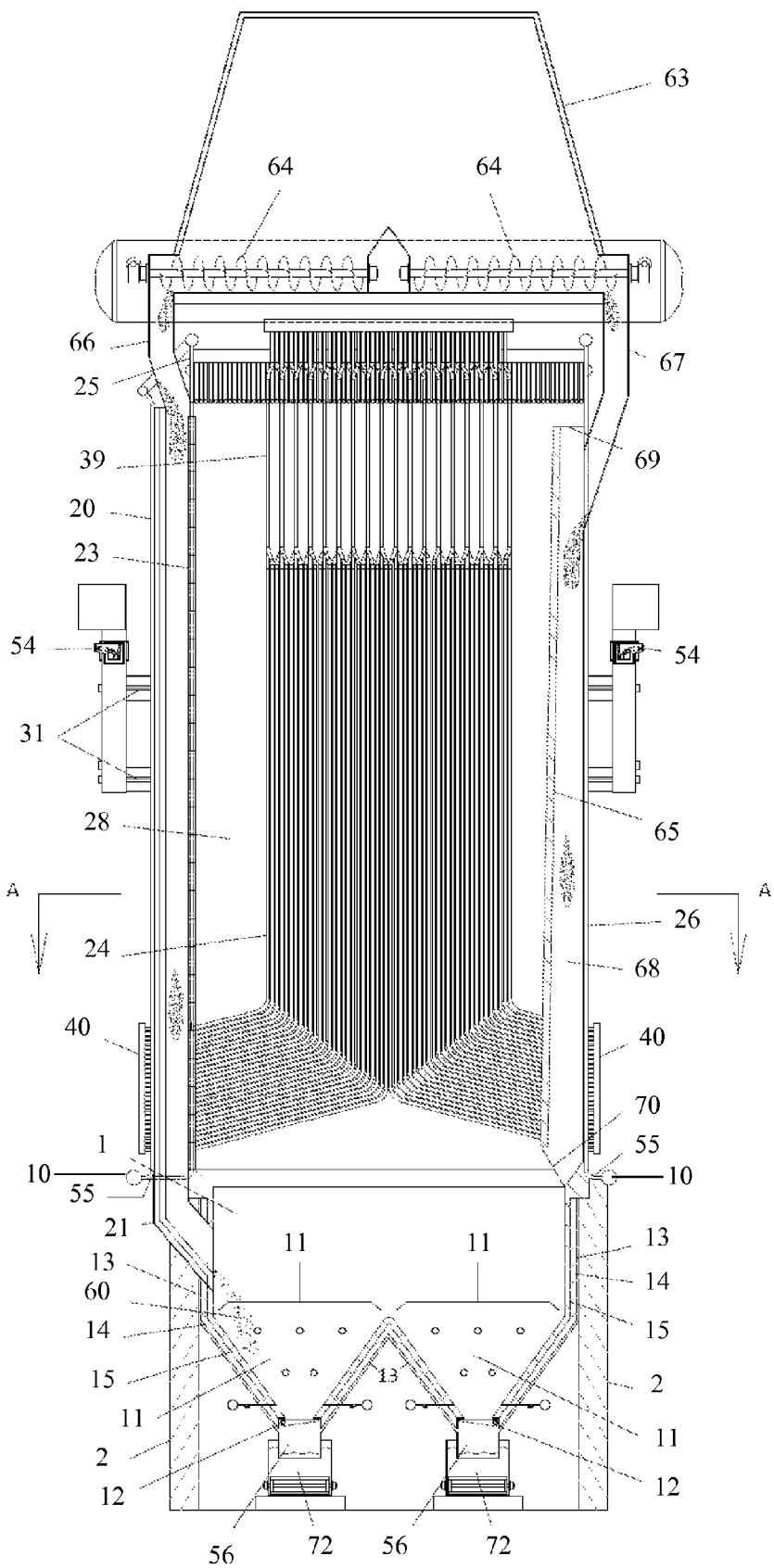
FIG. 2 is a sectional front view of a boiler in accordance with one or more embodiments of the present invention.
Figure 3:
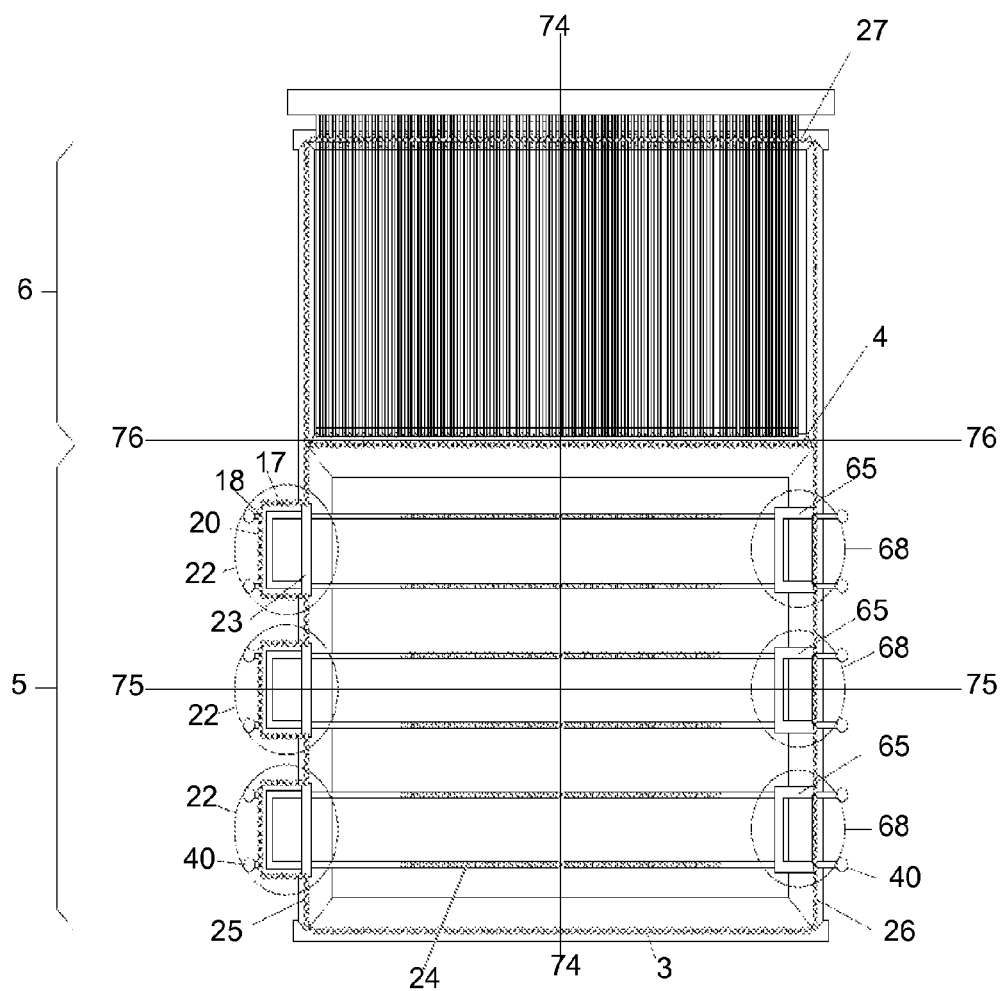
FIG. 3 is a sectional plan view cut through the boiler at Section A-A in FIG. 2 with the front of the boiler at the bottom.
Figure 4:
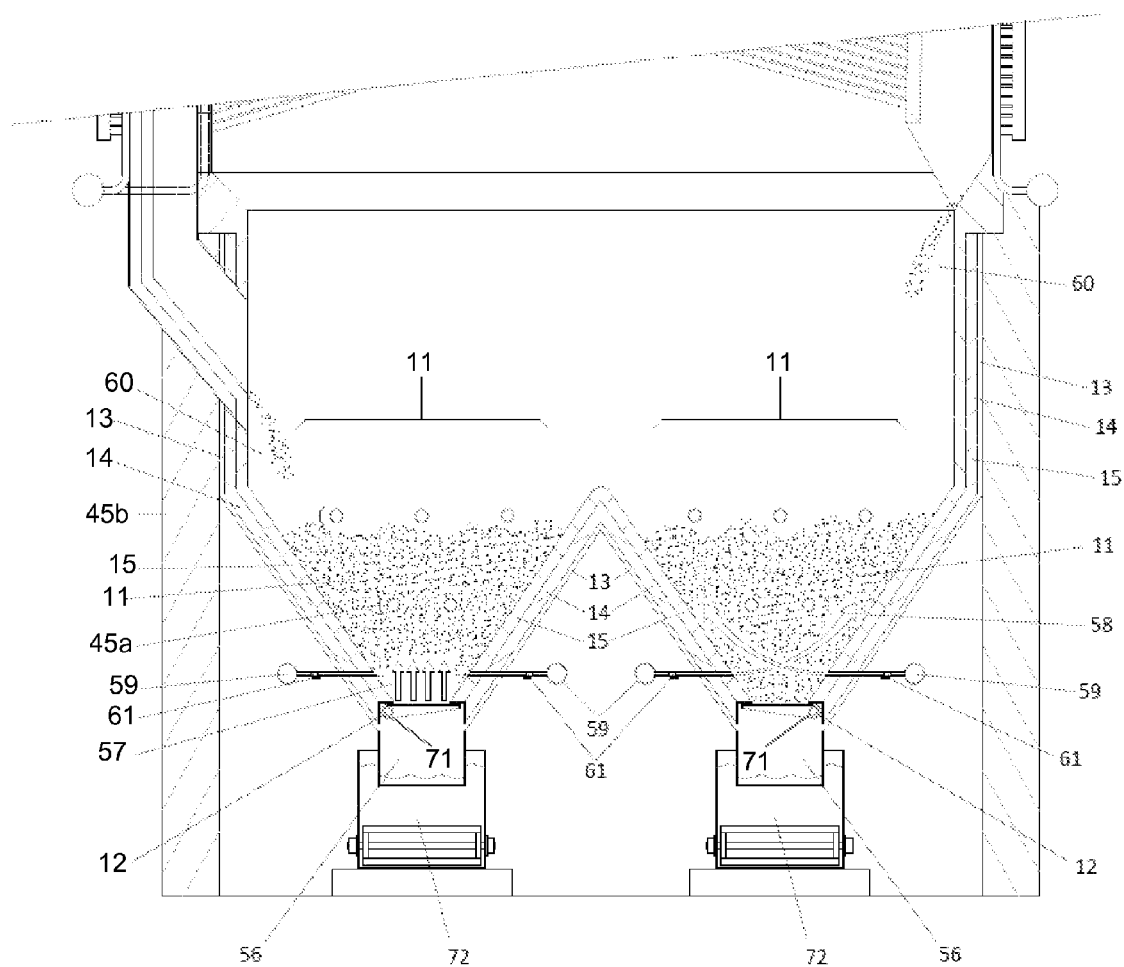
FIG. 4 is an enlargement of the bottom of the boiler from FIG. 2 to illustrate some of the features and operation of the boiler.
Figure 5:
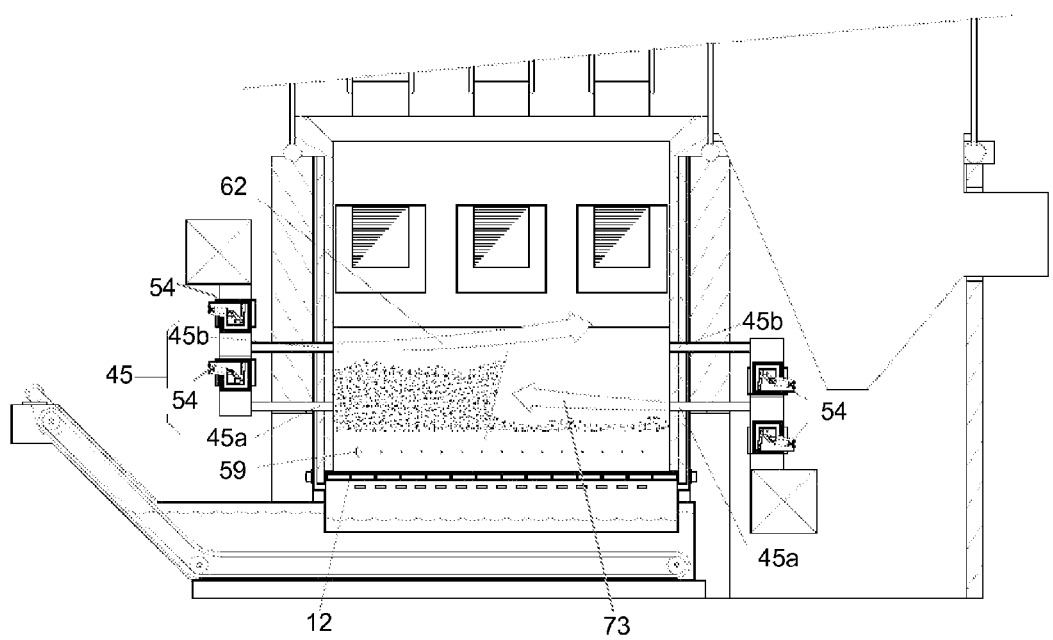
FIG. 5 is an enlargement of the bottom of the boiler from FIG. 1 to illustrate some of the features and operation of the boiler.

The accompanying drawings are referred to in the following description. FIG. 1 is a sectional side view of the boiler and FIG. 2 is a sectional front view. FIG. 3 is a sectional plan view cut through the boiler at Section A-A in FIG. 2 with the front of the boiler at the bottom. FIGS. 4 and 5 are enlargements of the bottom of the boiler from FIGS. 2 and 1 respectively to illustrate some of the features and operation of the boiler. The numbers in this text refer to like numbers illustrated in the drawings. Referring now to FIGS. 1 and 2, the combustion chamber 1 is surrounded by a reinforced concrete foundation 2 that rises 15 to 20 feet or more above the ground. Foundation walls 2 support front tube wall 3, left tube wall 25, right tube wall 26, and rear tube wall 27 of the boiler and intermediate foundation wall 7 supports intermediate tube wall 4 that separates the front pass 5 (the furnace) from back pass 6. Therefore in plan view the foundation is a rectangle with an intermediate wall 7 running side to side separating the foundation into a front chamber 8 and a rear chamber 9. The concrete has openings formed as necessary for personnel access, ducts, conveyors, combustion air ports, fuel injection, etc. The lower headers 10 or the lower extremities of the tube walls 55 sit on top of the concrete foundation and in turn support the tube walls 3, 4, 25, 26, 27 and the rest of the steel boiler structure above. The bottom of the boiler consists of one or more V-Cell 11 and ash grate 12 installed in the foundation front chamber 8 and suitably supported by features built into the foundation. A steel plenum duct 13 lines the four walls of the inside of foundation front chamber 8 from the top of the foundation walls to the bottom of V-Cells 11. V-cells 11 are preferably V-shaped, but other configurations are within the scope of the invention. Plenum duct 13 is comprised of inner and outer steel walls parallel to the foundation walls and spaced about 1½" apart with the outer walls in contact with the inside of the concrete foundation walls that form combustion chamber 1.

At least some of the combustion air and/or recirculated flue gas fed to the boiler flows through plenum duct 13, therefore plenum duct 13 acts as a thermal barrier between combustion chamber 1 and foundation 2 and intermediate foundation wall 7, and also as an air heater for at least some of the air and/or recirculated flue gas flowing to the boiler. Immediately to the inside of plenum duct 13 is a layer of thermal insulation 14, parallel to and in contact with the inner wall of plenum duct 13. The insulating layer 14 extends around the inside of the four walls of plenum duct 13 and extends from the bottom of V-Cells 11 to above the top of concrete foundation 2 and intermediate foundation wall 7. Insulating layer 14 may be comprised of insulating type refractory, ceramic paper, ceramic bats, poured refractory, precast refractory tiles, or some combination of these or other suitable materials. Insulating layer 14 may be from 4 inches to 6 inches thick. Immediately to the inside of insulating layer 14 is a layer of working refractory 15, parallel to and in contact with the inner surface of insulating layer 14. Working refractory layer 15 extends around the inside of the four walls of insulating layer 14 and extends from the bottom of V-Cells 11 to above the top of concrete foundation 2 and intermediate foundation wall 7. Working layer 15 may be up to 6 inches thick and the top edge of the four walls of working layer 15 are shaped to form a protective curb 16 reposed against the boiler tube walls. Working layer 15 is comprised of a high strength abrasion resistant refractory material with an operating temperature limit of up to 3000 degrees Fahrenheit. The refractory of working layer 15 also has relatively high density, high thermal conductivity, and high heat capacity. If multiple V-Cells are employed, plenum duct 13, insulating layer 14, and refractory layer 15 are extended between the V-Cells.

Referring to FIG. 4, the combustion air and/or flue gas flowing through plenum duct 13 flows into ash chutes 56 then up through perforations in ash grates 12 and then through the fuel residing in V-Cells 11 as shown by the arrows 57. FIG. 4 only shows arrows 57 on the left V-Cell for clarity, but all cells would typically be run that way. The air and/or flue gas pressure sufficient to force the air/gas up through the fuel pile is equal to the density of the fuel times the depth of the pile. This gas flow can account for up to 40% of the stoichiometric air requirement for burning the fuel. Additional air and/or recirculated flue gas is injected through agitation air ports 59 located three to twelve inches above the grate with a horizontal spacing of 3" to 24". This air/gas is injected at a relatively high pressure, 10-30 psi to agitate and loosen the fuel pile. This will help to move sand and rocks down to the ash grate and keep the lighter fuel and carbon at the surface. It also helps to distribute the fuel front to back and side to side after it drops from the fuel chutes at 60 and mixes combustion air and/or recirculated flue gas with the fuel to improve the drying and combustion of the fuel. Agitating air jets 58 can be turned on or off as needed to best achieve a preferred degree of agitation. A series of manual or automatically controlled valves 61 control which agitation air jets are on and off.

Referring to FIG. 5, agitation air ports 59 are arrayed above the ash grate in a horizontal row front to back with a row of ports on both opposing sides of the V-Cell. The horizontal separation distance between agitation air ports is from 6-18". One possible configuration is to have the agitation air ports turned on and off in an alternating pattern and opposite from side to side such that agitation air jets 58 form a side to side interlaced crossing pattern as shown in the right hand V-Cell in FIG. 5. Agitation air jets 58 are only shown on the right V-Cell for clarity but all cells would be run in a similar manner. Some of the combustion air and/or recirculated flue gas flowing through plenum duct 13, or from other ducts, is routed through sweep air ports 45 and injected into combustion chamber 1 from two opposing walls, (shown from the front and rear walls). The sweep air ports are generally arranged with a lower level of ports 45*a* 10 to 18 inches above ash grate 12 and an upper level of ports 45*b* at the top of V-cell 11. During normal operation lower level ports 45*a* are turned off or run at minimum flow (for cooling to prevent burnout of the metal sleeve lining the port opening). This allows the fuel to pile up to the level of upper sweep air ports 45*b*. Sweep air jets 62 flow across the top of the fuel pile leveling out the fuel and may supply additional combustion air (in addition to the ash grate air 57 and agitation air 58) if needed to keep the fuel pile burning at a consistent height near the top of V-Cell 11. Typically only the upper sweep air ports 45*b* on one wall will be turned on and the corresponding ports on the opposite wall will be turned off (or at least run at minimal flow for cooling). This will allow maximum penetration of sweep air jets 62 and maximize the effectiveness of that air/gas. Periodically, the upper sweep air ports 45*b* on opposing walls will "flip-flop", such that the wall that was on will turn off and vice-versa. This will ensure uniform formation of the fuel piles and uniform combustion across the top of the fuel pile. The sweep air ports 45*b* will flip-flop as frequently as needed to maintain consistent conditions, approximately every 15 minutes. Over-fired air ports 31, after burner airports 51, and sweep air ports 45 can all be fitted with automated dampers 54 that can be programmed to turn on and off at prescribed intervals. This will "flip-flop" the damper settings and reverse the circulation patterns to prevent a long term bias in the fuel formation or other aspects of the boiler operation.

It is also necessary to periodically remove ash, rocks, sand, and contaminants from the bottom of the boiler. To facilitate this the approximately horizontal opening at the bottom of each V-Cell 11 is fitted with ash grate 12 that pivots on shaft 71 to dump the ash etc. into ash conveyor 72 below. Ash chute 56 extends below the surface of the ash conveyor 72 to form a pressure seal between the boiler and the outside environment. Shaft 71 is water cooled and the water discharges from the shaft through a series of holes into ash conveyor 72. Ash grate 12 cannot be dumped, however, unless the fuel in V-Cell 11 above it is burned away leaving just ash and sand, etc. When it is time to dump the ash, fuel flow to the V-Cell to be dumped is temporarily stopped and fuel flow to an adjacent cell is temporarily increased to partially compensate. Air continues to flow through the fuel via air jets 57 and/or 58 and/or over the fuel at jets 62 so the fuel continues to burn aggressively. The fuel below the surface has been drying through the action of the air/gas jets and from heat absorbed from the combustion of the fuel above and from burning fuel that is cycled back down into the fuel pile by agitating jets 58, and will burn very quickly when exposed and that will further compensate for the reduced fuel flow. At this time lower sweep air ports 45*a* are turned on to ensure that the fuel is burned out completely before ash grate 12 is opened. The other jets 57, 58, and 62 are adjusted as necessary to complete the combustion without blowing ash back up into the boiler. Lower sweep air jets 73 can be arranged to flip-flop to ensure complete and level combustion of the remaining fuel. After the ash is dumped grate 12 returns to the closed position and fuel flow is restarted to the V-Cell. The residual heat in refractory layer 15 reignites the fuel as it flows back into the V-Cell. To minimize the disturbance caused by cutting fuel flow to one entire V-Cell, each V-Cell may be divided into front and rear halves by an intermediate separating wall (not shown). The construction of the separating wall is similar to the construction of the V-Cells. In that case each half of the V-Cell has an independently operating ash grate 12 and independent air supplies at 57, 58, and 73.

A first purpose of the described construction around the perimeter of combustion chamber 1 is to promote and support much higher combustion temperatures than current boilers. Working refractory layer 15 and insulating layer 14 have operating temperature limits up to 2800° F. or more as compared to bubbling fluidized bed boilers that have an operating limit around 1600° F. The purpose of insulating layer 14 is to retain as much of the heat of combustion as possible in the combustion chamber, without transmitting that heat to adjacent boiler walls, as in conventional boilers, or to the adjacent supporting structures of embodiments of the present invention. This will increase the temperature in the combustion chamber and allow the firing of wetter fuel. This also allows a significant reduction in the plan area of the boiler as the heat release is concentrated in a smaller area. This in turn reduces the overall size of the boiler and makes the boiler much less expensive to manufacture and erect. This gives embodiments of the present invention a significant economic advantage over other boilers that generate similar amounts of steam with similar fuels. Insulating layer 14 minimizes heat transfer out of combustion chamber 1 and working refractory layer 15 provides protection to insulating layer 14. While insulating layer 14 has low thermal conductivity, some heat will still be transmitted through it therefore plenum duct 13 is desirable for preventing overheating of concrete foundation 2 and intermediate foundation wall 7. A second purpose of the construction is to act as a heat sink around the combustion chamber. Working layer 15 has a relatively high heat capacity; therefore it will retain a lot of heat. If the temperature drops in combustion chamber 1, due for example to a batch of overly wet fuel, the heat contained in working layer 15 will be radiated to combustion chamber 1 where it will help to dry and ignite the wet fuel and stabilize the combustion process. Working refractory layer 15, in other words, acts as a thermal flywheel.

Referring back to FIGS. 1 and 2, fuel bin 63 is situated on top of, and supported by the boiler. The bin has a livebottom, that is, it has conveying screws 64 that fill a majority of the floor area of the bin, substantially reducing the possibility of plugging in the fuel bin. Many arrangements are possible but in the configuration shown, two parallel screws feed each fuel chute. The screws are split into left and right pairs corresponding to each fuel chute with the speed of each pair independently adjustable. Therefore the feed rate to each fuel chute is independently adjustable. The advantage of this arrangement is that it may reduce the number of conveyors used to get fuel to the boiler and improve the response of the boiler to load changes as there is no lag in getting fuel to the boiler. There are two versions of fuel chutes shown but typically one or the other version would be used. On the left of FIG. 2 fuel drops from conveying screws 64 through drop chute 66 and drops through fuel chute 22 comprised of upper chute 20 and lower chute 21 and then falls into the boiler at 60. The exterior walls of each upper fuel chute 20 are comprised of boiler tubes making a three sided chute, integral with the side wall of the boiler, with the interior of the chutes 20 open to front pass 5 (the interior of boiler). The exterior walls of each lower fuel chute 21 are comprised of reinforced concrete and form a three sided chute with the interior of the chutes 21 open to the interior of combustion chamber 1. The interiors of chutes 22 are lined with insulating layer 17 and working refractory layer 18 as shown. In FIGS. 1, 2, and 3, refractory tiles 23 are stacked one above another across the openings between upper fuel chutes 20 and the interior of the boiler 5, and across the openings between lower fuel chutes 21 and the interior of combustion chamber 1. Refractory tiles 23 serve to retain the fuel as it is falling through the chute and also to radiate heat absorbed from the front pass 5 and combustion chamber 1 to the falling fuel. The stack of refractory tiles 23 ends below the top of upper fuel chute 20 and above the bottom of fuel chute 21 leaving a passageway for combustion gasses to flow into the top of upper fuel chute 20 and out the bottom of lower fuel chute 21. The opening at the bottom of lower fuel chute 21 also allows the passage of the fuel into combustion chamber 1. Alternately refractory tiles 23 can be replaced with cast refractory. The hot combustion gas and/or radiant heat from refractory tiles 23 produces a drying effect on the falling fuel. The fuel chutes described above are more specifically detailed in U.S. patent application Ser. No. 12/471,081 and 61/522,939. On the right of FIGS. 2 and 3 a second version of the fuel chute 68 incorporates three sided refractory walls 65 located entirely inside the boiler. The advantage of this design is that it minimizes the number of wall tubes, is easily adaptable to an existing boiler, and increases the radiant heat transfer surface as three sides of each fuel chute 68 are exposed to the heat of combustion. The refractory comprising walls 65 may be pre-cast and pre-fired or it may be poured in place. In this version, conveying screws 64 discharge into drop chute 67 which then pass through a suitably formed opening in the tube wall. Drop chute 67 discharges into fuel chute 68 which is open at the top 69 and bottom 70. The fuel falling through the chute, and the reduction of temperature (increasing density) will induce a flow of hot combustion gas in at 69 and out at 70. The hot gas will further increase the drying of the fuel in the chute. Chute 68 may be designed to increase in cross sectional area as the fuel descends to minimize the potential for plugging the chute.

The outer boiler walls 3, 25, 26, 27 and intermediate boiler wall 4 are supported by foundation walls 2 and intermediate foundation wall 7 and may rise vertically to a height up to 80 feet or more above the ground. Interior to front pass 5 are multiple chamber walls 24 constructed of similar steel tubes to the boiler walls with the tubes side by side in closely spaced parallel configuration forming flat panels. The chamber walls 24 as shown in FIGS. 1, 2, and 3 are parallel to the front wall of the boiler and are spaced more or less evenly between front wall 3 and intermediate wall 4. The Chamber walls can alternatively be parallel to the sidewalls. The lower extremities of the tubes forming chamber walls 24 pass through the side walls 25 and 26, with half of the tubes forming each chamber wall coming in through left wall 25 and half through right wall 26. The tubes comprising one half of each chamber wall 24 pass through side walls 25 or 26 horizontally or with a slightly upward angle as they extend toward the middle of front pass 5. The more or less horizontal tubes are arrayed with one tube immediately above another so that all of the tubes forming half of one chamber wall 24 can pass through sidewall 25 or 26 between two wall tubes that have been bent apart for that purpose. When the two sets of tubes forming each half of the chamber walls 24 meet in the middle of the boiler, they turn upward and form a single panel that continues vertically and finally exits through the roof of the boiler. Chamber walls 24 are narrower than the width of the boiler such that gaps 28 exist between the outside edges of chamber walls 24 and left sidewall 25 and right sidewall 26. In some cases, over-fired air ports 31 are formed in sidewalls 25 and 26 to inject combustion air and/or recirculated flue gas between chamber walls 24. The arrangement of over-fired air ports 31 is typically one to three horizontal rows of ports 30 with each port in each row located approximately centered in the gap between chamber walls 24. Vertical separation between air port rows 30 can be 3 feet to 10 feet. Gaps 28 allow for circulation of combustion gasses around and between chamber walls 24. Over-fired air ports 31 are fitted with automated dampers 54 that can be programmed to turn on and off in unison and at prescribed intervals. This will "flip-flop" the damper settings to prevent a long term bias in the gas flow, heat transfer, tube fouling patterns, ash accumulation or other aspects of the boiler operation. FIGS. 1 and 3 show six chamber walls 24 but the number may vary depending on the size of the boiler and how much surface area is needed for heat transfer purposes.

Chamber walls 24 are made as tall as practical with the lower extremities just above the refractory walls 15 of combustion chamber 1 and extending up through the roof of the boiler 32. The lower ends of chamber walls 24 are fed by downcomer pipes (not shown) from steam drum 43 that feed relatively cold water to vertical headers 40 that in turn feed the individual tubes forming chamber walls 24. At the top of front pass 5, some of the tubes comprising chamber walls 24 are bent out of the plane of the chamber walls to form front to back passageways for the combustion gasses to pass through and exit to the rear of front pass 5. These are chamber wall screens 39. At this point the gasses stop flowing up and/or around the chamber walls and pass through chamber wall screens 39 to exit the front pass. Similarly, some of the tubes at the top of intermediate wall 4 are bent out of the plane of the wall to form rear screen 41. The vertical location of the cluster of over-fired air ports 31 within front pass 5 can be from just above V-Cells 11 to the top of the boiler depending on the application. For example, if the boiler is burning a light fuel such as bagasse or straw based fuels, over-fired air ports 31 may be preferentially located at a higher elevation. Light fuels tend to create a lot of fly ash that may not burn before leaving the furnace. By locating over-fired air ports 31 at a higher elevation, those fly ash particles have more opportunity to burn out before a final turbulent mixing with additional combustion air to assure their complete combustion. After chamber wall screens 39 and rear screen 41 pass through boiler roof 32 the tubes are bent back into the plane of chamber walls 24 and intermediate wall 4, respectively, and then terminate in collecting headers that are in turn connected back to steam drum 43. As the water in chamber walls 24 is heated it expands and becomes less dense and the heavier cold water flowing down from steam drum 43 pushes the hotter and lighter water upward creating a natural circulation through chamber walls 24.

Chamber walls 24 are arranged in a similar manner as screens in conventional boilers in that they are located in the front pass of the boiler and comprise some of the water circulation circuits of the boiler. The chamber walls are novel, however, in that they extend much lower in the boiler, can be arranged parallel to the front wall, are symmetrical in their arrangement, and are arranged so that combustion gasses can circulate around them. The chamber walls are also meant to take the place of the generating bank in conventional boilers therefore boiling will occur in the upper portion of chamber walls 24. The lower portion of chamber walls 24 are filled with water and therefore will be held close to the saturation water temperature. This prevents chamber walls 24 from over-heating at their lower extremities where the combustion gasses are hottest. The high differential temperature between the gasses leaving combustion chamber 1 and the surface of the lower portion of chamber walls 24 will create a high heat flux from the combustion gases to the water in the chamber wall tubes. This will rapidly reduce the temperature of the combustion gasses as they circulate around and rise past chamber walls 24 and will prevent overheating the chamber wall tubes even as the water is boiling at the upper ends of the tubes.

After flowing up and around chamber walls 24 and through chamber wall screens 39, the combustion gasses pass through rear screen 41 and enter back pass 6 where the gasses turn and flow vertically down over the superheaters 50. In some cases, a series of after-burner air ports 51 may be located below rear screen 41 and above superheaters 50 to inject a final amount of combustion air to complete the combustion of any syn-gas remaining in the flue gas stream. This can provide a means for controlling the steam temperature in the superheaters. The arrangement of after burner ports 51 may be in one or more levels with one or more ports at each level with the ports aligned to create interlaced or circulating gas flow patterns depending on the spacing of the ports or the setting of the control dampers. Automated dampers can be installed and programmed to control the flow pattern and periodically flip-flop the arrangement as described above for sweep air ports 45 and over-fired air ports 31. One or more gas or oil burners 82 may be installed at this location to ensure ignition of the cooled flue gas or to control final steam temperature by controlling the temperature of the flue gas entering the superheaters. The installation and arrangement of over-fired air ports 31 and after burner ports 51 depends on many factors including fuel type, emissions requirements, boiler loading, downstream processes, etc. For example, over-fired air ports 31 may be moved up or down in front pass 5 to fit specific requirements, or may be omitted altogether in favor of after burner ports 51, and vice versa.

The tubes forming superheaters 50 run horizontally back and forth across rear pass 6, either front to back or side to side. They can be arranged in a rectangular pattern with one tube above another but preferably arranged in a staggered pattern in which the combustion gas has to flow around all of the tubes. The latter arrangement is more thermally efficient but can be more difficult to clean. Being more thermally efficient, the staggered arrangement requires fewer tubes thereby reducing the cost of the boiler. Another feature of superheaters 50 are internal tube sheets 52 that channel the flue gasses across only the straight sections of the tubes. It is common that particulates in the flue gas stream preferentially erode the tubes at the bends therefore tube sheets 52 shield the tube bends and prevent their erosion. There are at least four significant advantages to the location of superheaters 50 in rear pass 6. First, as the superheaters are located downstream from chamber walls 24, chamber wall screens 39, and rear wall screen 41, the flue gas temperature entering superheaters 50 will be lower than if the superheaters were located in front pass 5 as is common practice. This will help prevent corrosion of the superheater tubes from chlorides present in the flue gas if, for example, the boiler is used to incinerate municipal waste containing plastic. A second advantage is water can be used to clean the superheater tubes as there is no danger of water interfering with the combustion process. This allows tighter spacing of the superheater tubes which can compensate for lower flue gas temperature and/or reduce the overall surface area of the superheater. A third advantage is that the location lends itself to reheating the combustion gasses (either with additional combustion air or auxiliary burners as described above) to provide steam temperature control independent from the combustion requirements in the front pass. A fourth advantage is that the location in the back pass lends itself to modularizing the superheaters as described below. Superheaters in conventional boilers are typically placed at the top of the boiler above the bullnose and arranged with the combustion gas in cross flow. The superheater platens are typically spaced 7-12" or more apart to minimize the potential to plug between the platens. This wide spacing increases the superheater surface area and the volume (furnace size) to enclose the superheaters.

Embodiments of the present invention improve on previous technology by lowering the amount of capital employed and improving the operation of power boilers. Chamber walls 24 and intermediate wall 4 replace a typical generating bank but are widely spaced therefore, like boiler walls 3, 25, 26, and 27, are not prone to plugging. Chamber walls 24 and intermediate wall 4 are water filled; therefore the metal is more protected by being held at a lower temperature than superheaters. The chamber walls are exposed on both sides to the hot combustion gasses and the combustion gasses are in more intimate contact with chamber walls 24 and intermediate wall 4 than outside walls 3, 25, 26, and 27 therefore they will transfer much more heat than the outside boiler walls. This large heat transfer rate collapses the gas temperature quickly so that by the time the gas enters back pass 6 the gas temperatures are lower than in a conventional boiler. This makes any accumulated material easier to remove and creates an opportunity to control the gas temperature in back pass 6 by the introduction of additional combustion air through air ports 51. Chamber walls 24 also scrub ash and particulates from the combustion gas flowing through the boiler. The suspended ash and particulates will tend to stick to the surfaces they contact (until they accumulate sufficiently and are eventually shed or blown off by sootblowers) so the gasses will deposit a large part of the suspended material on chamber walls 24 before the gasses enter back pass 6. Chamber wall screens 39 and rear wall screen 41 are widely spaced and combined with the lower gas temperature and less particulates, will be much easier to clean by sootblowers located adjacently. So the chamber walls are advantageous compared to a generating bank because they collapse gas temperature, trap particulates yet are easier to clean, reduce the boiler volume, improve heat transfer rates, and reduce the overall cost of the boiler.

Superheaters 50 located in back pass 6 are in cross flow arrangement (as in a conventional boiler) but because much of the particulates have been trapped out by chamber walls 24, the tubes can be more closely spaced, even in a staggered arrangement, improving the heat transfer efficiency. Due to the lower gas temperature in back pass 6, more surface area may be needed in superheaters 50 but this is offset by the more efficient tube arrangement and the improved cleanliness of superheaters 50. With the superheaters 50 located in the back pass, and with lower gas temperature, the tubes can be cleaned more effectively with conventional sootblowers or even periodically with water. This ensures much cleaner tube surfaces and allows for a reduction in the surface area of the tubes as well as an overall reduction in the size of the boiler. With less particulates reaching the superheaters and lower gas temperature, less steam may be used to clean the superheaters when using conventional sootblowers, lowering the operating cost of the boiler. Also, the tubes comprising superheaters 50 are all the same length (as opposed to tapered pendants in a conventional boiler) allowing more economical fabrication. Embodiments of the present invention also have the advantage of being ground supported. Conventional large power boilers are suspended from overhead with the thermal expansion more or less centered at the steam drum. As described above, embodiments of the present invention can be much smaller than a conventional boiler for the same load rate and with intermediate wall 4 the construction is very rigid. Therefore the boiler can support the weight of steam drum 43 and it can move up and down with the boiler expansion. This eliminates the need for a very strong building surrounding the boiler. So embodiments of the present invention are less expensive to build and operate and run better than a conventional boiler of the same load rate.

Finally, embodiments of the present invention may incorporate modular construction to facilitate on-site erection. Referring now to FIG. 3, if the boiler is sized to produce 120 tons of steam per hour, the width of the boiler (centerline distance from left sidewall 25 to right sidewall 26) may be about 16 feet, the depth of the front pass (centerline distance from front wall 3 to intermediate wall 4) may be about 19 feet, and the depth of the rear pass (centerline distance from intermediate wall 4 to rear wall 27) may be about 10 feet. Embodiments of the invention that are approximately this size may be constructed in six sections as shown divided by lines 74-74, 75-75, and 76-76. Front pass 5 may be divided into quadrants and rear pass 6 may be divided into halves. Each quadrant of front pass 5 may be fabricated as an independent module containing half of sidewall 25 or 26, half of front wall 3 or intermediate wall 4, and part of the roof of the boiler. Each quadrant module also may contain the portion of chamber walls 24 that reside in that quadrant. Each of these modules may be prefabricated with inlet and outlet headers, fuel chutes, buckstays, port openings, ducting, connection points, lifting points, supports, etc. as could be installed at the factory. Each module may be pressure tested at the factory potentially resulting in fewer bad welds in the field and potentially reducing non-destructive testing time in the field. The inlet and outlet headers may be fabricated in halves and may remain independent after the boiler is erected to eliminate the need to field weld and heat treat those large diameter pipes. Referring to FIG. 1, in each of the two front-most modules of front pass 5, the tubes comprising front wall 3 may bend over at the top of the boiler to form roof tubes 32 terminating in relieving header 77. Header 77 may be divided in two independent halves, each half connected to its respective module. Similarly, the tubes comprising intermediate wall 4 may bend over at the top to form roof tubes 78 terminating at relieving header 79, also divided into two independent halves. Each half of rear pass 6 may be similarly fabricated as an independent module containing half of the superheaters. Rear tubes forming rear wall 27 may bend over at the top to form rear pass roof 80 and terminating in relieving header 81, also divided into independent halves. Each of these modules may be sized to allow transportation by truck with a maximum size of approximately 12 feet by 10 feet by 60 feet. Modules of this size and construction may weigh up to 75,000 pounds which is well within the lifting capacity of common mobile cranes. V-Cells 11 and combustion chamber 1 may also be prefabricated as much as possible including insulating and refractory components where practical. The erection sequence may start with the concrete foundation which is poured on site. Then the boiler modules are lifted into their respective positions one at a time. As the modules are set in place, they are bolted and/or welded together at strategic locations to hold the modules in alignment. In particular, the buckstays (not shown), prefabricated with each module, are bolted together to hold the modules together. When each module is in place, and the alignment is confirmed, each module is seal welded to the adjacent modules. When all boiler modules are in place the combustion chamber and V-Cell modules can be installed. When the boiler modules are welded together, the steam drum can be lifted in place. The pressure parts are completed by connecting the feed and relieving headers to the steam drum via intermediate pipes (not shown for clarity). Finally, all of the auxiliary equipment can be installed such as the fuel bin, fuel screws, ducting, fans, ash grate, ash conveyors, pumps, piping, platforms, etc. Furthermore, it is not necessary to erect a large building to support the boiler before the boiler construction can begin. The ground supported, modular design of embodiments of the invention will greatly speed up the field erection process and greatly reduce the temporal and financial uncertainties commonly associated with that phase of boiler construction.

An alternative embodiment of the present invention is used as a gasifier. As a gasifier, fuel enters the boiler in the same manner as described in the first embodiment, but is burned in sub-stoichiometric conditions and only to the extent desirable for maximizing the production of syn-gas. Refractory lining 15 and insulating lining 14 absorb much heat of combustion in combustion chamber 1 promoting high-temperature fuel gasification. If the gasifier is operated predominately as a syn-gas producer, it is preferred to inject pure oxygen to minimize the syn-gas dilution from nitrogen. In that case, the oxygen can be injected through agitation air ports 59 to agitate the fuel piles and inject oxygen directly into the fuel. Only enough oxygen is injected to produce the concentrated syn-gas production targets. Grate air 57 and sweep air 62 can also be adapted to inject oxygen to maintain and control the temperature in combustion chamber 1. It is important to reduce the temperature of the syn-gas before it is pulled off the boiler so that it can be handled, cleaned, and acid gases ($CO_2$, $H_2S$, COS) removed. Chamber walls 24 will be very effective in reducing the gas temperature before it leaves the boiler. Over-fired air ports 31 may not be required and the syn-gas may leave the boiler just downstream from rear screen 41. As a gasifier the boiler will be configured to produce saturated steam at a rate proportional to the heat released but not used by the gasification process. If production of superheated steam is desirable, some of the syn-gas may be allowed to flow into back pass 6 where after burner ports 51 can inject air to burn those gases to superheat the steam. Alternately a separate fuel, such as natural gas, can be burned at the location of afterburner ports 51 to superheat the steam. If production of superheated steam is not desired, back pass 6 and superheaters 50 may not be required.

In accordance to some embodiments of the present invention, the floor of a solid fuel fired boiler may be configured as one or more troughs in which most of the fuel firing the boiler falls into the troughs and burns therein, where each of the troughs comprises an outer supporting structure, an inner refractory layer, and an insulating layer between the outer supporting structure and the inner refractory lining.

In some embodiments, the outer supporting structure comprises a duct system configured to convey combustion air, oxygen, or recirculated boiler flue gas, or any combination thereof, to the combustion chamber of the boiler.

In some embodiments, the bottoms of each of the troughs are truncated resulting in approximately horizontal openings in the bottoms of each of the troughs, and in which a chute means extends downwards from each of the openings and a perforated movable grate floor resides below each of the openings such that each of the movable grate floors may be opened periodically to discharge the contents of each of the troughs.

In some embodiments, combustion air, oxygen, or recirculated boiler flue gas, or any combination thereof, may be injected below each of the perforated movable grate floors and then flows up through each of the perforated movable grate floors.

In some embodiments, each of the perforated movable grate floors is supported by a rotatable shaft, and each of the floors opens by rotating each of the shafts.

In some embodiments, each of the rotatable shafts is water cooled.

In some embodiments, an agitating gas comprising air, oxygen, recirculated boiler flue gas, or any combination thereof, may be injected through agitation air ports located within one or more sides of each of the trough or troughs in a manner sufficient to agitate and loosen the fuel residing therein, and wherein the flow and/or pressure through any agitation gas port may be adjusted independently of any other agitation gas port.

In some embodiments, one or more sweep air ports may be located above the agitation air ports, where these sweep air ports would be configured to inject jets of air, oxygen, recirculated boiler flue gas, or any combination thereof, in a manner to sweep across the top of the fuel level, and wherein any established sweep air flow pattern may be periodically reversed.

In some embodiments, the troughs in the boiler floor may be separated by an intermediate wall or walls of similar construction as the boiler floor.

In accordance to some embodiments of the present invention, a solid fuel fired boiler may be configured with one or more walls internal to the furnace section of the boiler, where each of the walls could comprise closely spaced steel tubes in mutually parallel relationship and aligned such that the axes of the tubes are vertical for the majority of their length, with the tubes comprising one or more water and/or steam circulation circuits within the boiler.

In some embodiments, the boiler may be configured with an outer supporting structure lined with insulation, and wherein the insulation is lined with a refractory material.

In some embodiments, an air plenum may be located between the insulation and the supporting structure.

In some embodiments, one or more fuel chutes may be configured integral with one or more exterior walls of the boiler in which fuel flowing through the chute or chutes is directly exposed to hot boiler gas or to thermal radiation from one or more surfaces of the fuel chutes which are heated by the hot boiler gas to effect partial drying of the fuel.

In some embodiments, one or more of the fuel chutes may be configured with three sides internal to the furnace.

In some embodiments, the boiler may be configured with a front pass and a back pass, wherein the back pass comprises a superheater and combustion air ports configured to complete the combustion of volatile gasses and/or control the temperature of the steam exiting said superheater.

In some embodiments, oxygen may be used to cause combustion of a portion of the fuel therein, wherein the heat released by this combustion may cause gasification of the remaining fuel.

In some embodiments, the boiler may be constructed with one or more internal tube walls configured to rapidly cool said gasified fuel.

In some embodiments, the boiler may comprise oil or gas fired burners located within the back pass and configured to control the temperature of the steam exiting the boiler.

In accordance to some embodiments of the present invention, a solid fuel fired boiler has a fuel bin located on top with a multiplicity of fuel chutes configured to conduct fuel to a furnace of the boiler, wherein the majority of the floor area of the fuel bin comprises conveying screws configured to feed fuel at a controlled rate from the fuel bin to each of the multiplicity of fuel chutes, wherein each of the conveying screws is configured to convey fuel at an independently-controllable rate to the furnace of the boiler.

In some embodiments, the boiler is configured with a multiplicity of modules, and the boiler may be assembled from these modules on-site at a desired operating location for the boiler.

In some embodiments, one module incorporates any combination of at least part of the front wall, at least part of a side wall, at least part of the roof, and at least part of the internal wall or walls of the boiler.

In some embodiments, one module incorporates any combination of at least part of the rear wall or rear wall of a front pass, at least part of a side wall, at least part of the roof, and at least part of the internal wall or walls of the boiler.

In some embodiments, at least one module incorporates any combination of at least part of a rear wall, at least part of a side wall, at least part of the roof, and at least part of the superheaters of the boiler.

In accordance to some embodiments of the present invention, a method of operating a solid fuel fired boiler comprises the steps of loading fuel into a fuel bin located at the top of the boiler; conveying the fuel from the bottom of the fuel bin into the entrance of a conveying screw; transferring fuel from the entrance of the conveying screw to the exit of the conveying screw by means of rotary motion of the conveying screw; loading the fuel into the top of the fuel chute from the exit of the conveying screw into the top end of a fuel chute; and dropping fuel down the fuel chute to a furnace of the boiler.

In some embodiments, the rate of transfer of fuel from the entrance to the exit of the conveying screw is controlled by the rotational rate of the screw.

In some embodiments, a multiplicity of conveying screws enable independent control of the rate of fuel transfer from the fuel bin to each of a multiplicity of fuel chutes.

In some embodiments, a furnace construction process for a solid fuel fired boiler, comprises the steps of configuring an outer support structure to generally define the dimensions of one or more cells in the furnace; lining the support structure with insulating material; lining the insulating material with refractory material; and configuring one or more fuel chutes to convey fuel into each of the one or more cells in the furnace.

In accordance to some embodiments of the present invention, a method of constructing a solid fuel fired boiler comprises the steps of configuring a furnace in one or more cells, where each cell comprises an outer support structure; an insulator layer lining the support structure; and a refractory layer lining the insulator layer; positioning an array of chamber walls above the furnace for generation of steam, wherein each wall comprises a generally vertical array of approximately parallel steam-generating tubes; and locating at the top of the boiler a fuel bin, comprising a floor largely comprised of a one or more fuel-conveying screws.

A boiler as described herein has many aspects believed to be novel. The furnace may be subdivided into one or more V-cells, each lined with insulation and refractory material. The insulation allows the refractory material to retain heat, acting as a "thermal flywheel", thereby smoothing out variations in the furnace temperature which might otherwise arise due to changes in the water content of the fuel. This refractory material also allows higher furnace operating temperatures, thereby enabling the use of wetter fuels and higher fuel combustion efficiencies. A fuel bin is positioned above the boiler assembly with a live bottom comprising a number of conveying screws which directly transfer fuel from the fuel bin to a multiplicity of fuel chutes, each of which, in turn, conveys fuel directly to the furnace. This fuel supply mechanism enables rapid variation in the rate of fuel feed down each of the chutes to allow for quick adjustments in the rate of fuel supply to each V-cell in the furnace. Alternative fuel chute designs are possible within the scope of the invention. In some fuel chute designs, three walls of each fuel chute are directly heated by the hot combustion gases, and this heat may then be transferred to the falling fuel before it reaches the furnace. The conventional steam generating bank is replaced by an array of chamber walls, each comprising a large number of approximately vertical parallel steam-generating pipes which extend downwards to near the top of the furnace, and upwards to near the top of the boiler. Advantages of this chamber wall design include improved heat transfer between the combustion gases and the pipes in the chamber wall, reduced gas temperatures exiting the front pass of the boiler, wider pipe spacings to reduce potential boiler plugging, and the ability to position the chamber walls parallel to the front of the boiler. The boiler is partitioned into front and rear passes, with the superheater piping located in the rear pass and not directly in the upward vertical flow of combustion gases from the furnace. This configuration has the advantage that the temperature of the superheated steam can be independently controlled, the gases passing over the superheater tubes are at a lower temperature thus reducing corrosion, water cleaning of the superheater tubes is possible since the water will not fall into the furnace, and the superheater tubes may be spaced closer together since cleaning is easier. Other advantages of the front/rear pass design are an improved ability to control the gasification process, including the introduction of oxygen to reduce nitrogen contamination of the syn-gas, and the use of additional burners to regulate gas temperatures within the rear pass independently of gas temperatures within the front pass. Bed-fired water tube boilers employing a design according to aspects of the present invention may be more compact than conventional solid fuel burning boilers, thus a ground-mounted approach may be adopted, avoiding the need for robust construction techniques required for hung-boiler designs. The present invention facilitates the use of modular design approaches in which the boiler may be fabricated in multiple sections at a factory off-site, and subsequently transported in pieces to the location on-site at which the boiler is to be fully-assembled and operated. This potentially enables substantial cost and time savings for boiler installations compared with conventional boiler design and assembly approaches.

Although embodiments of the present invention and their advantages are described in detail above and below, it should be understood that the described embodiments are examples only, and that various changes, substitutions and alterations can be made herein without departing from the spirit and scope of the invention as defined by the appended claims. The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

We claim as follows:

1. A floor of a solid fuel fired boiler comprising one or more cells in which most of the fuel firing said boiler falls into said cell or cells and burns therein, each of said cell or cells having sloping sides and including an outer supporting structure, an inner refractory layer, and an insulating layer between said outer supporting structure and said inner refractory lining, and wherein the bottoms of each of said cell or cells are truncated resulting in openings in the bottoms of each of said cell or cells, and a movable grate floor resides below each of said openings such that each of said movable grate floors may be opened periodically to discharge the contents of each of said cell or cells;
   further comprising a plenum from which combustion air, oxygen, or recirculated boiler flue gas, or any combination thereof, is injected from below each of said movable grate floors and then flows up through each of said movable grate floors; and
   in which each of said movable grate floors is supported by a rotatable shaft, and each of said floors opens by rotating each of said shafts.

2. The boiler floor of claim 1 in which said outer supporting structure comprises a duct system configured to convey combustion air, oxygen, or recirculated boiler flue gas, or any combination thereof, to the combustion chamber of said boiler.

3. The boiler floor of claim 1 further comprising a plenum from which combustion air, oxygen, or recirculated boiler flue gas, or any combination thereof, is injected from below each of said movable grate floors and then flows up through each of said movable grate floors.

4. The boiler floor of claim 1 in which each of said shafts is water cooled.

5. The boiler floor of claim 1 further comprising agitation air ports located within one or more sides of each of said cell or cells, through which an agitating gas comprising air, oxygen, recirculated boiler flue gas, or any combination thereof, is injected in a manner sufficient to agitate and loosen the fuel residing therein, and wherein the flow and/or pressure through any agitation air port may be adjusted independently of any other agitation air port.

6. The boiler floor of claim 5, further comprising one or more sweep air ports located above said agitation air ports, said sweep air ports injecting jets of air, oxygen, recirculated boiler flue gas, or any combination thereof, in a manner to sweep across the top of said fuel level, and wherein any established sweep air flow pattern may be periodically reversed.

7. The boiler floor of claim 1 in which said cells are separated by an intermediate wall or walls of similar construction as said boiler floor.

8. The boiler floor of claim 1 in which each of said cell or cells has a V-shaped cross section.

9. The boiler floor of claim 1 further comprising a chute extending downward from each of the openings.

10. The boiler floor of claim 1 in which said movable grate floor comprises a perforated moveable floor grate.

11. The boiler floor of claim 1 further comprising a plenum duct extending along the walls of said one or more cells.

12. The boiler floor of claim 11 in which the plenum is positioned between inner refractory layer and the insulating layer.

13. A method of constructing a solid fuel fired boiler comprising:
   configuring a furnace in one or more cells, each comprising:
      an outer support structure;
      an insulator layer lining said support structure; and
      a refractory layer lining said insulator layer;
      wherein the bottoms of each of said cell or cells are truncated resulting in openings in the bottoms of each of said cell or cells, and a movable grate floor resides below each of said openings such that each of said movable grate floors may be opened periodically to discharge the contents of each of said cell or cells;
      in which each of said movable grate floors is supported by a rotatable shaft, and each of said floors opens by rotating each of said shafts
   positioning an array of chamber walls above said furnace for generation of steam, wherein each wall comprises a generally vertical array of approximately parallel steam-generating tubes; and
   locating at the top of said boiler a fuel bin, comprising a floor including one or more fuel-conveying screws.

14. The method of claim 13 in which configuring a furnace in one or more cells includes configuring a furnace in which each of the cells includes side walls that slope towards an opening above a movable grate floor.

15. The method of claim 13 in which configuring a furnace in one or more cells includes configuring a furnace in which each of the cells includes configuring a V-shaped cross section.

16. A solid fuel boiler including a boiler floor comprising one or more cells in which most of the fuel firing said boiler falls into said cell or cells and burns therein, each of said cell or cells having sloping sides and including an outer supporting structure, an inner refractory layer, and an insulating layer between said outer supporting structure and said inner refractory lining, and wherein the bottoms of each of said cell or cells are truncated resulting in openings in the bottoms of each of said cell or cells, and a movable grate floor resides below each of said openings such that each of said movable grate floors may be opened periodically to discharge the contents of each of said cell or cells
   further comprising a plenum from which combustion air, oxygen, or recirculated boiler flue gas, or any combination thereof, is injected from below each of said movable grate floors and then flows up through each of said movable grate floors; and in which each of said movable grate floors is supported by a rotatable shaft, and each of said floors opens by rotating each of said shafts.

17. The solid fuel boiler of claim 16 further comprising a concrete foundation supporting said one or more cells.

18. The solid fuel boiler of claim 16 in which the concrete foundation includes foundation walls that support tube walls.

\* \* \* \* \*